(12) United States Patent
Davydov et al.

(10) Patent No.: US 10,164,755 B2
(45) Date of Patent: *Dec. 25, 2018

(54) TRANSMISSION POINT INDICATION IN COORDINATED MULTI-POINT SYSTEM

(71) Applicant: Intel Corporation, Santa Clara, CA (US)

(72) Inventors: Alexei Vladimirovich Davydov, Nizhny Novgorod (RU); Gregory Vladimirovich Morozov, Nizhny Novgorod (RU); Alexander Alexandrovich Maltsev, Nizhny Novgorod (RU); Ilya Alexandrovich Bolotin, Nizhny Novgorod (RU); Vadim Sergeyevich Sergeyev, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/645,888

(22) Filed: Jul. 10, 2017

(65) Prior Publication Data

US 2017/0310524 A1 Oct. 26, 2017

Related U.S. Application Data

(63) Continuation of application No. 15/061,839, filed on Mar. 4, 2016, now Pat. No. 9,735,998, which is a (Continued)

(51) Int. Cl.
*H04L 5/14* (2006.01)
*H04W 72/04* (2009.01)
(Continued)

(52) U.S. Cl.
CPC .............. *H04L 5/14* (2013.01); *H04B 7/024* (2013.01); *H04B 7/0456* (2013.01);
(Continued)

(58) Field of Classification Search
None
See application file for complete search history.

(56) References Cited

U.S. PATENT DOCUMENTS

| 2010/0035611 A1 | 2/2010 | Montojo et al. |
| 2010/0189038 A1 | 7/2010 | Chen et al. |

(Continued)

FOREIGN PATENT DOCUMENTS

| CN | 101800593 | 8/2010 |
| CN | 101800593 A | 8/2010 |

(Continued)

OTHER PUBLICATIONS

Office Action dated Jul. 11, 2017 from Russian Divisional Application No. 2016118360, 6 pages.

(Continued)

*Primary Examiner* — Kodzovi Acolatse
(74) *Attorney, Agent, or Firm* — Schwabe, Williamson & Wyatt, P.C.

(57) ABSTRACT

Embodiments of the present disclosure describe devices, methods, computer-readable media and systems configurations for transmission point indication in a coordinated multipoint (CoMP) system. A user equipment (UE) may receive common reference signal (CRS) parameters associated with individual base stations of a CoMP measurement set. The UE may also receive a transmission point index corresponding to a first base station of the CoMP measurement set that is scheduled for communications with the UE. A mapping module of the UE may produce a physical downlink shared channel (PDSCH) mapping pattern based (Continued)

on the CRS parameters associated with the scheduled base station.

25 Claims, 5 Drawing Sheets

Related U.S. Application Data continuation of application No. 13/997,588, filed as application No. PCT/RU2012/000235 on Mar. 29, 2012, now Pat. No. 9,320,015.

(60) Provisional application No. 61/556,109, filed on Nov. 4, 2011.

(51) Int. Cl.
| | |
|---|---|
| *H04W 4/70* | (2018.01) |
| *H04W 76/11* | (2018.01) |
| *H04W 76/40* | (2018.01) |
| *H04B 7/024* | (2017.01) |
| *H04B 7/0456* | (2017.01) |
| *H04W 4/06* | (2009.01) |
| *H04W 24/02* | (2009.01) |
| *H04W 72/08* | (2009.01) |
| *H04W 52/24* | (2009.01) |
| *H04J 3/12* | (2006.01) |
| *H04L 5/00* | (2006.01) |
| *H04W 52/14* | (2009.01) |
| *H04W 68/02* | (2009.01) |
| *H04L 1/00* | (2006.01) |
| *H04L 27/26* | (2006.01) |
| *H04J 11/00* | (2006.01) |
| *H04L 1/18* | (2006.01) |
| *H04W 56/00* | (2009.01) |
| *H04B 7/06* | (2006.01) |
| *H04W 72/02* | (2009.01) |
| *H04W 52/34* | (2009.01) |
| *H04W 84/14* | (2009.01) |
| *H04W 88/02* | (2009.01) |
| *H04W 88/08* | (2009.01) |
| *H04W 72/12* | (2009.01) |

(52) U.S. Cl.
CPC ............ *H04B 7/0626* (2013.01); *H04J 3/12* (2013.01); *H04J 11/00* (2013.01); *H04L 1/0026* (2013.01); *H04L 1/0077* (2013.01); *H04L 1/1812* (2013.01); *H04L 5/0035* (2013.01); *H04L 5/0053* (2013.01); *H04L 5/0055* (2013.01); *H04L 5/0078* (2013.01); *H04L 27/2646* (2013.01); *H04L 27/2662* (2013.01); *H04L 27/2675* (2013.01); *H04W 4/06* (2013.01); *H04W 4/70* (2018.02); *H04W 24/02* (2013.01); *H04W 52/146* (2013.01); *H04W 52/242* (2013.01); *H04W 56/0015* (2013.01); *H04W 68/02* (2013.01); *H04W 72/02* (2013.01); *H04W 72/042* (2013.01); *H04W 72/0413* (2013.01); *H04W 72/0446* (2013.01); *H04W 72/085* (2013.01); *H04W 76/11* (2018.02); *H04W 76/40* (2018.02); *H04W 52/244* (2013.01); *H04W 52/34* (2013.01); *H04W 72/12* (2013.01); *H04W 84/14* (2013.01); *H04W 88/02* (2013.01); *H04W 88/08* (2013.01); *Y02D 70/00* (2018.01); *Y02D 70/20* (2018.01)

(56) References Cited

U.S. PATENT DOCUMENTS

| | | | |
|---|---|---|---|
| 2011/0038310 A1 | 2/2011 | Chmiel et al. | |
| 2011/0268007 A1 | 11/2011 | Barany et al. | |
| 2011/0292903 A1* | 12/2011 | Jongren | ................ H04L 5/0032 370/329 |
| 2012/0077518 A1 | 3/2012 | Logan | |
| 2012/0155414 A1 | 6/2012 | Noh et al. | |
| 2012/0176884 A1 | 7/2012 | Zhang et al. | |
| 2012/0282936 A1* | 11/2012 | Gao | ...................... H04L 5/0023 455/450 |
| 2013/0003788 A1 | 1/2013 | Marinier et al. | |
| 2013/0029657 A1 | 1/2013 | Gao et al. | |
| 2013/0114496 A1* | 5/2013 | Mazzarese | ............ H04L 5/0023 370/312 |

FOREIGN PATENT DOCUMENTS

| | | |
|---|---|---|
| CN | 102047626 A | 5/2011 |
| CN | 102143593 A | 8/2011 |
| JP | 201025861 A | 11/2010 |
| KR | 2011-0033974 A | 4/2011 |
| RU | 2419203 C2 | 5/2011 |
| WO | 2008/057898 A2 | 5/2008 |
| WO | 2008156064 A1 | 8/2010 |
| WO | 2010/085738 A3 | 9/2010 |
| WO | 2011/046334 A2 | 4/2011 |
| WO | 2011/135964 A1 | 11/2011 |

OTHER PUBLICATIONS

Notice of Preliminary Rejection dated Aug. 29, 2017 from Korean Divisional Application No. 2017-7017675, 7 pages.
Office Action dated Sep. 3, 2015 from Russian Patent Application No. 2014117724.
International Search Report and Written Opinion dated Jul. 12, 2012 from International Application No. PCT/RU2012/000235.
Office Action dated Apr. 30, 2015 from Korean Patent Application No. 2014-7012071.
Final Rejection dated Oct. 28, 2015 from Korean Patent Application No. 2014-7012071.
Office Action dated May 19, 2015 from Japanese Patent Application No. 2014-539905.
Office Action dated Oct. 13, 2015 from Japanese Patent Application No. 2014-539905.
Extended European Search Report dated Jul. 17, 2015 from European Patent Application No. 12845287.7.
V. Vishnevsky et al., "Tekhnologiya sotovoi svyazi LTE-pochti 4G. Cellular communcation technology LTE—Almost 4G," Nauka, Tekhnologiya, Biznes Jan. 2009 [online], retrieved from the internet: <URL:http://www.electronics.ru/files/article_pdf/0/article_162_584.pdf>, pp. 66, left col., par. 4, right col., par. 1.
Etri, "Downlink control signaling for downlink CoMP," 3GPP TSG RAN WG1 Meeting #66bis, R1-113066, Agenda Item: 7.5.3.2, Oct. 10-14, 2011, Zhuhai, China, 4 pages.
Etri, "High-level views on downlink CoMP schemes," 3GPP TSG RAN WG1 Meeting #66bis, R1-113068, Agenda Item: 7.5.1, Oct. 10-14, 2011, Zhuhai, China, 3 pages.
Huawei, Hisilicon, "Text proposal for standard impacts and design principles of CoMP in Rel-11," 3GPP TSG RAN WG1 meeting #66, R1-112785, Agenda Item: 6.5.2, 11, Aug. 22-26, 2011, Athens, Greece, 11 pages.
ZTE, "Consideration on specification impact of CoMP," 3GPP TSG RAN WG1 Meeting #66, R1-112259, Agenda Item: 6.5.2, Aug. 22-26, 2011, Athens, Greece, 5 pages.
Texas Instruments, "PDSCH Muting: N-MSE for Inter-cell CSI Estimation," 3GPP TSG RAN WG1 #61bis, R1-103698, Agenda Item: 6.3.2, Jun. 28-Jul. 2, 2010, Dresden, Germany, 7 pages.
3GPP, "Technical Specification Group Radio Access Network; Coordinated multi-point operation for LTE physical layer aspects (Release 11)," 3GPP TR 36.819 V11.0.0 (Sep. 2011), Lte Advanced, 68 pages.

(56) References Cited

OTHER PUBLICATIONS

Office Action dated Apr. 28, 2016 from Korean Divisional Application No. 2015-7017578, 9 pages.
Office Action dated May 10, 2016 from Japanese Patent Application No. 2014-539905, 3 pages.
Extended European Search Report dated Jul. 5, 2016 from European Divisional Application No. 16166204.4, 10 pages.
Samsung, Discussion on the Specification Impact of CoMP, 3GPP TSG RAN WG1 #66, R1-112512, Agenda Item: 6.5.2, Aug. 22-26, 2011, Athens, Greece, 4 pages.
Etri, "Downlink control signaling for downlink CoMP," 3GPP RAG RAN WG1 Meeting #66bis, R1-113555, Agenda Item: 7.5.3.2, Oct. 10-14, 2011, Zhuhai, China, 3 pages.
Article 94(3) dated Nov. 25, 2016 from European Patent Application No. 12845287.7, 7 pages.
Office Action dated Jan. 10, 2017 from Japanese Divisional Application No. 2016-026362, 4 pages.
Fujitsu, "Downlink Control Signaling for CoMP," 3GPP TSG RAN WG1 Meeting #68bis, R1-113469, Agenda Item: 7.5.3.2, Oct. 10-14, 2011, ZhuHai, China, 3 pages.
Russian Patent Office—Office Action dated Apr. 26, 2018 fro Russian Divisional Application No. 2018102117, 7 pages.
Chinese Patent Office—First Office Action dated Jun. 7, 2018 from Chinese Divisional Application No. 201610276115.2, 13 pages.
Japanese Patent Office—Notice of Reasons for Rejection dated Oct. 23, 2018 from Japanese Divisional Application No. 2017-246314, 10 pages.

\* cited by examiner

200

|  | Index | Number of CRS antenna ports | CRS frequency shift |
|---|---|---|---|
| eNB 104 | 0 | 2 | 1 |
| eNB 112 | 1 | 2 | 2 |
| eNB 116 | 2 | 4 | 4 |

Figure 2

TRANSMISSION POINT INDICATION IN COORDINATED MULTI-POINT SYSTEM

CROSS REFERENCE TO RELATED APPLICATIONS

The present application is a continuation of U.S. patent application Ser. No. 15/061,839, filed Mar. 4, 2016, entitled "TRANSMISSION POINT INDICATION IN COORDINATED MULTI-POINT SYSTEM," which is a continuation of U.S. patent application Ser. No. 13/997,588 with 371(c) filing date of Sep. 12, 2013, entitled "TRANSMISSION POINT INDICATION IN COORDINATED MULTI-POINT SYSTEM," which is national phase entry under 35 U.S.C. § 371 of International Application No. PCT/RU2012/000235, filed Mar. 29, 2012, entitled "TRANSMISSION POINT INDICATION IN COORDINATED MULTI-POINT SYSTEM," which claims priority to U.S. Provisional Patent Application No. 61/556,109, filed Nov. 4, 2011, entitled "ADVANCED WIRELESS COMMUNICATION SYSTEMS AND TECHNIQUES." The entire content and disclosures of which are hereby incorporated by reference in their entireties.

FIELD

Embodiments of the present invention relate generally to the field of communications, and more particularly, to transmission point indication in wireless communication networks.

BACKGROUND

Coordinated multipoint (CoMP) systems have been developed in order to improve various operational parameters in wireless networks. In CoMP systems that utilize dynamic point selection (DPS), a transmission point may be selected from a plurality of nodes (e.g., base stations) of a CoMP measurement set. The transmission point may be dynamically assigned by a serving node. However, since the user equipment does not know the identity or characteristics of the current transmission point, common reference signal (CRS, also referred to as cell-specific reference signal) positions across all nodes in the CoMP measurement set must be muted.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 2 is a configuration table in accordance with various embodiments.

DETAILED DESCRIPTION

Illustrative embodiments of the present disclosure include, but are not limited to, methods, systems, and apparatuses for transmission point indication in a coordinated multi-point (CoMP) system of a wireless communication network.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in some embodiments" is used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B". The phrase "at least one of A, B and C" means (A), (B), (C), (A and B), (A and C), (B and C) or (A, B and C). The phrase "(A) B" means (B) or (A and B), that is, A is optional.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims and the equivalents thereof.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
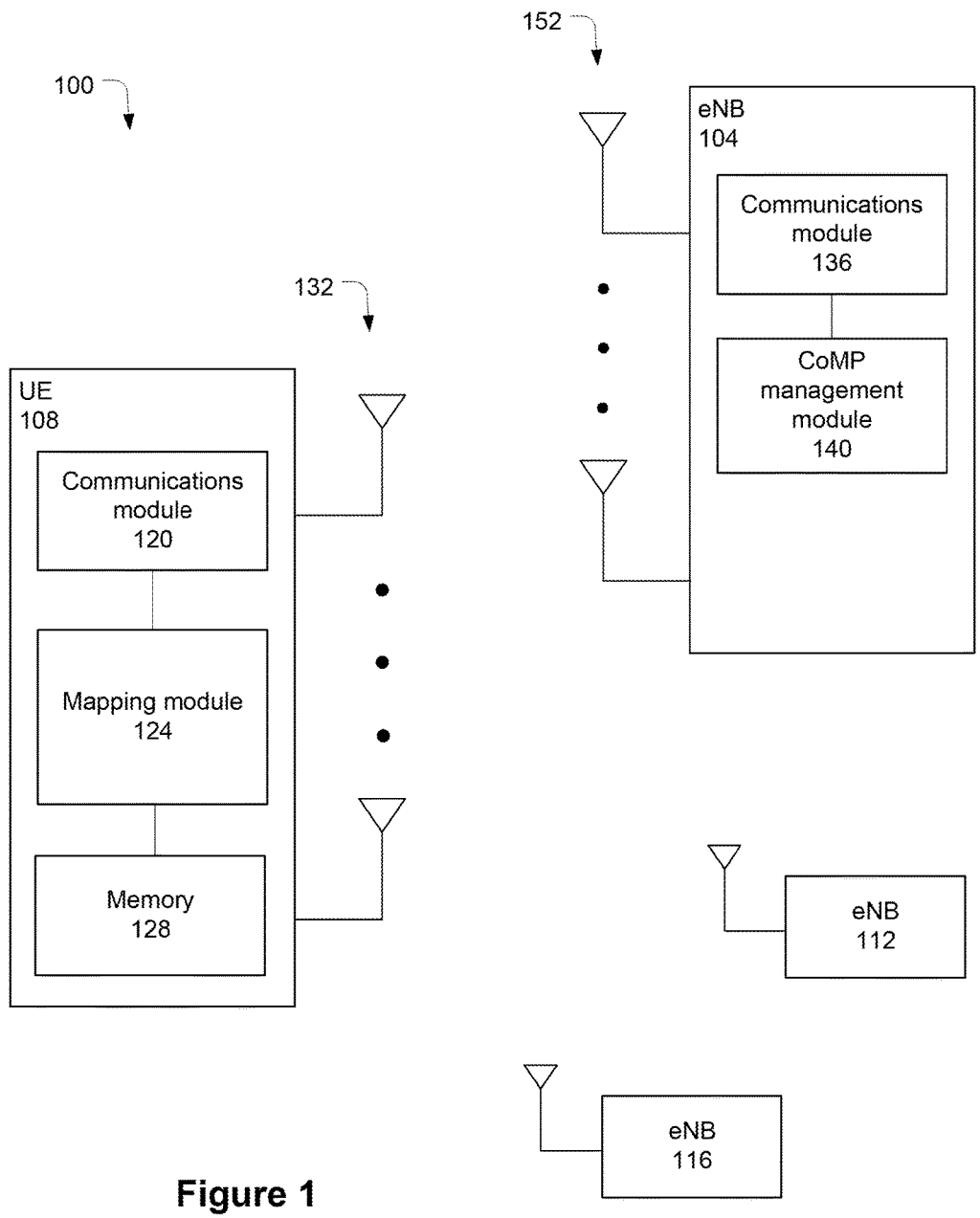
FIG. 1 schematically illustrates a wireless communication network in accordance with various embodiments.

FIG. 1 schematically illustrates a wireless communication network 100 in accordance with various embodiments. Wireless communication network 100 (hereinafter "network 100") may be an access network of a 3rd Generation Partnership Project (3GPP) long-term evolution (LTE) network such as evolved universal mobile telecommunication system (UMTS) terrestrial radio access network (E-UTRAN). The network 100 may include a base station, e.g., enhanced node base station (eNB) 104, configured to wirelessly communicate with user equipment (UE) 108.

At least initially, the eNB 104 may have an established wireless connection with the UE 108 and may operate as a serving node within a CoMP measurement set. One or more additional eNBs of the network 100, e.g., eNBs 112 and 116, may also be included within the CoMP measurement set. eNBs 112 and 116 may be configured to facilitate wireless communication with the UE 108 through coordination with the eNB 104. The one or more additional eNBs may be collectively referred to as "coordinating nodes." An eNB may transition between coordinating and serving node roles.

The serving node and coordinating nodes may communicate with one another over a wireless connection and/or a wired connection (e.g., a high-speed fiber backhaul connection).

The eNBs may each have generally the same transmission power capabilities as one another or, alternatively, some of the eNBs may have relatively lower transmission power capabilities. For example, in one embodiment the eNB 104 may be a relatively high-power base station such as a macro eNB, while the eNBs 112 and 116 may be relatively low-power base stations, e.g., pico eNBs and/or femto eNBs.

The UE 108 may include a communications module 120, a mapping module 124, and memory 132 coupled with one another at least as shown. The communications module 120 may be further coupled with one or more of a plurality of antennas 132 of the UE 108 for communicating wirelessly over network 100.

The UE 108 may include any suitable number of antennas. In various embodiments, the UE 108 may include at least as many antennas as a number of simultaneous spatial layers or streams received by the UE 108 from the eNBs, although the scope of the present disclosure may not be limited in this respect. The number of simultaneous spatial layers or streams may also be referred to as transmission rank, or simply rank.

One or more of the antennas 132 may be alternately used as transmit or receive antennas. Alternatively, or additionally, one or more of the antennas 132 may be dedicated receive antennas or dedicated transmit antennas.

In various embodiments, the communications module 120 may receive common reference signal (CRS) parameters associated with individual base stations of the CoMP measurement set (e.g., eNBs 104, 112, and/or 116). For example, the CRS parameters may include an index, a number of CRS antenna ports, and/or a CRS frequency shifts associated with each base station of the CoMP measurement set. These parameters, which may vary among the base stations of the CoMP measurement set, may be used by the communications module 120 to accurately and efficiently identify relevant CRS transmissions.

FIG. 2 is a CRS configuration table 200 with various CRS parameters in accordance with some embodiments. The CRS configuration table 200 (hereinafter "table 200") may be stored in memory 128 and accessible by the mapping module 124. The transmission point index may be a value subsequently used in the communication of which node is the scheduled transmission point. The CRS antenna ports may be the antenna ports, either virtual or physical, of the base station over which CRS transmissions are transmitted. In some embodiments, the number of CRS antenna ports may be 1, 2, or 4. The CRS frequency shift may be a cell-specific frequency shift (e.g., in terms of number of subcarriers) that may be used to avoid constant collocation of reference signals from different cells. In some embodiments, the CRS frequency shift may be 0, 1, 2, 3, 4, or 5.

In some embodiments, the CRS parameters may further include information related to a quantity and/or location of resource elements (e.g., sub-carriers and/or OFDM symbols) of the OFDM frame that are dedicated to control information and/or multicast/broadcast single frequency network (MBSFN) information for the individual base stations of the CoMP measurement set. The resource elements used for control information and/or the MBSFN subframes may not include the CRS.

In some embodiments, the UE 108 may store the received CRS parameters in memory 128. The UE 108 may keep the CRS parameters so long as the UE 108 is associated with the CoMP measurement set, and/or for another suitable length of time.

Subsequent to the configuration of the table 200 with the appropriate CRS parameters, the communications module 120 may receive a transmission point index corresponding to a base station of the CoMP measurement set that is scheduled for communication with the UE 108 (e.g., according to a dynamic point selection (DPS) protocol). The mapping module 124 may then access the CRS parameters that correspond with the received transmission point index and produce a physical downlink shared channel (PDSCH) mapping pattern based on the CRS parameters of the scheduled base station. The PDSCH mapping pattern may be used for subsequent communications with the scheduled base station. For example, the PDSCH mapping pattern may identify locations (e.g., resource elements) of CRSs in an orthogonal frequency division multiplexing (OFDM) frame transmitted by the scheduled base station. The resource elements may correspond to one or more sub-carriers and/or OFDM symbols in the OFDM frame. Accordingly, the PDSCH mapping pattern may be specifically tailored to the scheduled base station.

In some embodiments, the CRS parameters may be transmitted to the UE 108 by the serving base station (e.g., eNB 104). In some embodiments, the CRS parameters may be transmitted to the UE 108 via radio resource control (RRC) signaling. The CRS parameters may be transmitted during configuration of the CoMP measurement set for the UE 108 (e.g., as part of a CoMP measurement set configuration protocol). The CoMP measurement set configuration protocol may also include configuration of channel state information reference signal (CSI-RS) parameters and/or an uplink control channel for channel state information (CSI) feedback. Accordingly, the UE 108 may receive and/or transmit one or more CSI-RS parameters and/or uplink control channel parameters as part of the CoMP measurement set configuration protocol.

In various embodiments, the communications module 120 may receive the transmission point index via physical layer signaling. For example, in one embodiment, the transmission point index may be included in downlink control information (DCI), e.g., via a downlink control channel. This may allow for dynamic communication of relevant CRS parameters contemporaneously with the dynamic switching of the various transmission points in a DPS protocol. The DCI may further include other parameters for scheduling communications between the UE 108 and one or more base stations.

The transmission point index may identify the base station (e.g., transmission point) of the CoMP measurement set that is scheduled for communications with UE 108 (e.g., for transmission on the PDSCH). For example, the transmission point index may include one or more bits corresponding to the scheduled base station. In some embodiments, a small number of bits may be needed to identify the scheduled base station. For example, if the CoMP measurement set includes two base stations, the transmission point index may include one bit, and/or if the CoMP measurement set includes three or four base stations, the transmission point index may include two bits. In other embodiments, the transmission point index may include the same number of bits regardless of the number of base stations included in the CoMP measurement set. It will be apparent that other suitable mechanisms of identifying the scheduled base station may be used.

In some embodiments, the transmission point index may be transmitted by the scheduled base station. For example, eNB 104 may send UE 108 a transmission point index identifying eNB 104 as the scheduled base station. In other embodiments, the transmission point index may be transmitted by a different base station from the scheduled base station. For example, eNB 104 may send UE 108 a transmission point index that identifies eNB 112 as the scheduled base station.

The mapping module 124 may use the transmission point index to identify the CRS parameters (e.g., from memory 128) corresponding to the scheduled base station. The mapping module 124 may produce a PDSCH mapping pattern based on the CRS parameters for the scheduled base station. For example, the quantity of CRS antenna ports of the scheduled base station may be used to identify resource elements (e.g., sub-carriers and/or OFDM symbols) of the OFDM frame that are dedicated to CRS transmission. The CRS frequency shift may be specific to the scheduled base station, and may be used to identify the CRS locations (e.g., resource elements) of the OFDM frame for the scheduled base station.

The communications module 120 may then receive one or more transmissions from the scheduled base station, the transmission including an OFDM frame having a plurality of CRSs. The CRSs may be arranged in the OFDM frame according to the PDSCH mapping pattern.

In various embodiments, the transmission point (e.g., scheduled base station) may be dynamically assigned. The UE 108 may receive additional transmission point indexes if the identity of the scheduled base station changes and/or periodically at any suitable timing interval.

eNB 104 may include a communications module 136 and a CoMP management module 140 coupled with one another at least as shown. The communications module 136 may be further coupled with one or more of a plurality of antennas 152 of the eNB 104. The communications module 136 may communicate (e.g., transmit and/or receive) with one or more UEs (e.g., UE 108). In various embodiments, the eNB 104 may include at least as many antennas as a number of simultaneous transmission streams transmitted to the UE 108, although the scope of the present disclosure may not be limited in this respect. One or more of the antennas 152 may be alternately used as transmit or receive antennas. Alternatively, or additionally, one or more of the antennas 152 may be dedicated receive antennas or dedicated transmit antennas. The CoMP management module 140 may transmit (e.g., via the communications module 136), CRS parameters associated with the individual base stations of the CoMP measurement set as described above.

Though not shown explicitly, the eNBs 112 and 116 may include modules/components similar to those of the eNB 104.

The transmission point indication as described herein may allow the UE 108 to know which base station of the CoMP measurement set is scheduled as the transmission point for the UE 108 (e.g., according to a DPS protocol). Additionally, the UE 108 may know the CRS parameters associated with the scheduled transmission point, and may thus produce a PDSCH mapping pattern that is tailored specifically to the scheduled base station.

In DPS systems, demodulation reference signal (DM-RS) antenna ports may be dynamically assigned to base stations for transmission. The base station may apply the same pre-coding scheme (e.g., spatial and/or multiple input multiple output (MIMO) pre-coding scheme) to the DM-RS as on the PDSCH. Accordingly, the UE may not need to know the identity of the transmission point in order to receive DM-RS to decode the PDSCH transmission. However, different base stations may have different quantities of CRS ports and/or may have a CRS frequency shift that is dependent on the identity of the base station. Accordingly, the CRS configuration (e.g., arrangement of CRSs within the PDSCH transmission) may change from one base station to another.

In prior CoMP systems, to enable DPS the CRS positions for all base stations in the CoMP measurement set may be muted in the PDSCH. However, this approach requires high overhead due to unused resources in the PDSCH. Additionally, the muting of CRS locations may adversely affect legacy UEs (e.g., UEs that are not capable of CoMP communications) that conduct interference measurements on CRS. For example, a legacy UE conducting interference measurements on a CRS position may not receive the interference from other base stations (since the other base stations mute the CRS locations). Accordingly, the legacy UE may produce interference measurements that do not accurately measure the interference from the other base stations. This may lead to incorrect modulation and coding decisions, which may in turn lead to increased error and/or throughput drops for the legacy UE.

In contrast, the transmission point indication described herein allows the UE to know the CRS parameters of the base station scheduled for transmission to the UE. The UE may thus produce a PDSCH mapping pattern that is tailored specifically to the scheduled base station. The transmission by the base station may not need to mute the CRS locations of other base stations in the CoMP measurement set. This may save overhead from unused resources for all UEs associated with the base stations of the CoMP measurement set (e.g., UEs that are capable of CoMP communications and legacy UEs that are not capable of CoMP communications). Additionally, the transmission point indication may not impact the interference measurements of legacy UEs on CRS.

Figure 3:
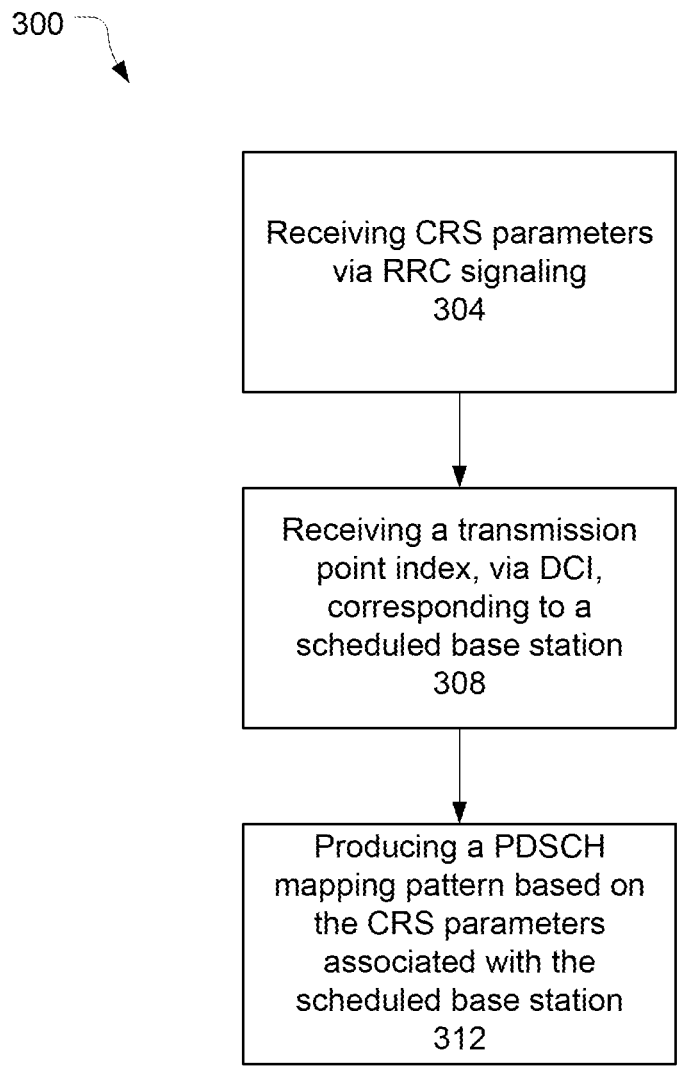
FIG. 3 is a flowchart illustrating a transmission point indication method that may be performed by a user equipment in accordance with various embodiments.

FIG. 3 illustrates a transmission point indication method 300 in accordance with various embodiments. The transmission point indication method 300 may be performed by a UE (e.g., the UE 108). In some embodiments, the UE may include and/or have access to one or more computer-readable media having instructions stored thereon, that, when executed, cause the UE to perform the method 300.

At block 304, the UE may receive CRS parameters via RRC signaling. The CRS parameters may be associated with individual base stations of a CoMP measurement set that includes a plurality of base stations. In some embodiments, the CRS parameters may include a quantity of CRS antenna ports and/or a CRS frequency shift of the individual base stations of the CoMP measurement set. The UE may receive the CRS parameters as part of a CoMP configuration protocol. The CoMP configuration protocol may also include configuring CSI-RS parameters and the uplink control channel for CSI-RS feedback. Accordingly, the UE may also receive one or more CSI-RS parameters and/or uplink control channel parameters via RRC signaling, in addition to the CRS parameters. The UE may store the received CRS parameters in memory.

At block 308, the UE may receive a transmission point index via DCI. The transmission point index may correspond to a scheduled base station of the CoMP measurement set that is scheduled for communications with the UE (e.g., scheduled as the transmission point for the UE).

At block 312, the UE may produce a PDSCH mapping pattern based on the received CRS parameters associated with the scheduled base station. The PDSCH mapping pattern may be used for subsequent communications between the UE and the scheduled base station. For example, the UE may receive a transmission on the PDSCH from the scheduled base station that includes an OFDM frame. The OFDM frame may include a plurality of CRSs arranged within the frame according to the PDSCH mapping pattern.

Figure 4:
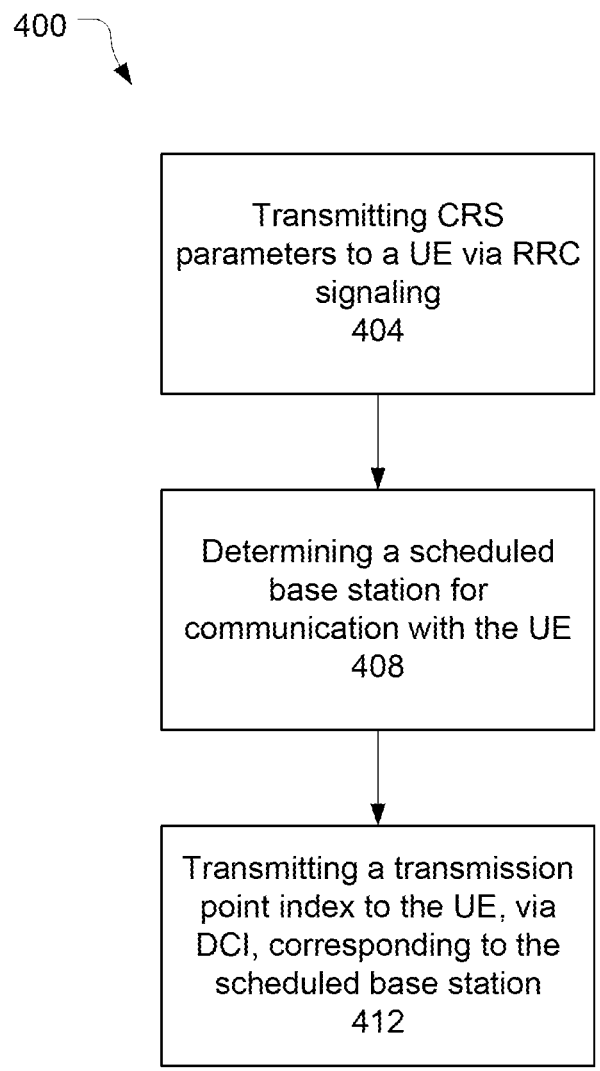
FIG. 4 is a flowchart illustrating a transmission point indication method that may be performed by a base station in accordance with various embodiments.

FIG. 4 illustrates a transmission point indication method 400 that may be performed by a base station (e.g., eNB 104) in accordance with various embodiments. The base station may be the serving node of a CoMP measurement set that includes a plurality of base stations.

At block 404, the base station may transmit CRS parameters to a base station via RRC signaling. The CRS parameters may include a quantity of CRS antenna ports and/or a CRS frequency shift of the individual base stations of the CoMP measurement set. The base station may transmit the CRS parameters as part of a CoMP configuration protocol. The CoMP configuration protocol may also include configuring CSI-RS parameters and the uplink control channel for CSI-RS feedback.

The base station may be pre-configured to know the CRS parameters for the plurality of base stations of the CoMP measurement set. Alternatively, or additionally, the base station may receive the CRS parameters for one or more base stations from the respective base station(s). In some embodiments, the base station may store the CRS parameters for the plurality of base stations in memory.

In some embodiments, a CoMP management module may determine which base stations are included in the CoMP measurement set. The CoMP management module may be included in the base station and/or in another location (e.g., in the core network including the base station). In some embodiments, the CoMP measurement set may be different for different UEs within a cell covered by the base station.

At block 408, the CoMP management module may determine which base station of the CoMP measurement set will be the scheduled base station for the UE. The determination of the scheduled base station may be made based on any suitable factors, such as channel conditions, relative loads on the base stations, relative power of the base stations, and/or other factors.

At block 412, the base station may transmit a transmission point index to the UE via DCI. The transmission point index may identify a scheduled base station of the CoMP measurement set that is scheduled as the transmission point for the UE. The scheduled base station may then transmit PDSCH signals to the UE. In some embodiments, the transmission point index may be transmitted by the scheduled base station. In other embodiments, the transmission point index may be transmitted by another base station that is not the scheduled base station.

Figure 5:
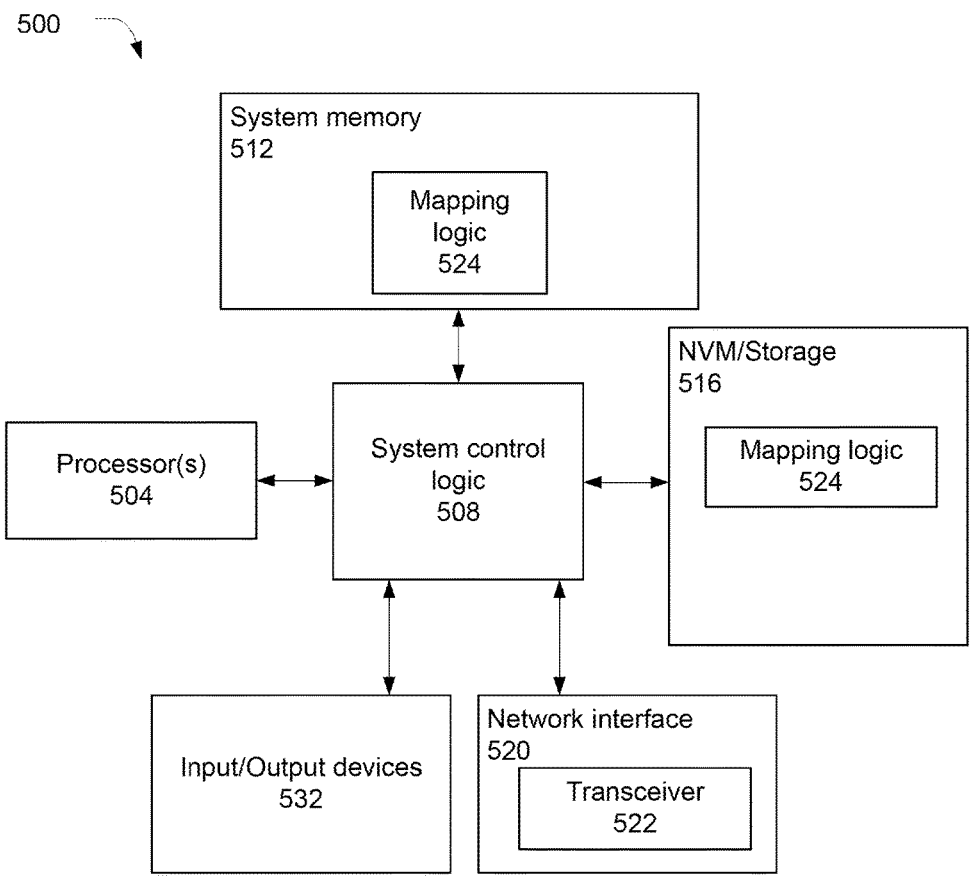
FIG. 5 schematically depicts an example system in accordance with various embodiments.

The UE 108 described herein may be implemented into a system using any suitable hardware and/or software to configure as desired. FIG. 5 illustrates, for one embodiment, an example system 500 comprising one or more processor(s) 504, system control logic 508 coupled with at least one of the processor(s) 504, system memory 512 coupled with system control logic 508, non-volatile memory (NVM)/storage 516 coupled with system control logic 508, a network interface 520 coupled with system control logic 508, and input/output (I/O) devices 532 coupled with system control logic 508.

The processor(s) 504 may include one or more single-core or multi-core processors. The processor(s) 504 may include any combination of general-purpose processors and dedicated processors (e.g., graphics processors, application processors, baseband processors, etc.).

System control logic 508 for one embodiment may include any suitable interface controllers to provide for any suitable interface to at least one of the processor(s) 504 and/or to any suitable device or component in communication with system control logic 508.

System control logic 508 for one embodiment may include one or more memory controller(s) to provide an interface to system memory 512. System memory 512 may be used to load and store data and/or instructions, for example, for system 500. System memory 512 for one embodiment may include any suitable volatile memory, such as suitable dynamic random access memory (DRAM), for example.

NVM/storage 516 may include one or more tangible, non-transitory computer-readable media used to store data and/or instructions, for example. NVM/storage 516 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 516 may include a storage resource physically part of a device on which the system 500 is installed or it may be accessible by, but not necessarily a part of, the device. For example, the NVM/storage 516 may be accessed over a network via the network interface 520 and/or over Input/Output (I/O) devices 532.

System memory 512 and NVM/storage 516 may respectively include, in particular, temporal and persistent copies of mapping logic 524. The mapping logic 524 may include instructions that when executed by at least one of the processor(s) 504 result in the system 500 implementing a mapping module, e.g., mapping module 124, to perform the PDSCH mapping operations described herein. In some embodiments, the mapping logic 524, or hardware, firmware, and/or software components thereof, may additionally/alternatively be located in the system control logic 508, the network interface 520, and/or the processor(s) 504.

Network interface 520 may have a transceiver 522 to provide a radio interface for system 500 to communicate over one or more network(s) and/or with any other suitable device. The transceiver 522 may implement communications module 120. In various embodiments, the transceiver 522 may be integrated with other components of system 500. For example, the transceiver 522 may include a processor of the processor(s) 504, memory of the system memory 512, and NVM/Storage of NVM/Storage 516. Network interface 520 may include any suitable hardware and/or firmware. Network interface 520 may include a plurality of antennas to provide a multiple input, multiple output radio interface. Network interface 520 for one embodiment may include, for example, a wired network adapter, a wireless network adapter, a telephone modem, and/or a wireless modem.

For one embodiment, at least one of the processor(s) 504 may be packaged together with logic for one or more controller(s) of system control logic 508. For one embodiment, at least one of the processor(s) 504 may be packaged together with logic for one or more controllers of system control logic 508 to form a System in Package (SiP). For one embodiment, at least one of the processor(s) 504 may be integrated on the same die with logic for one or more controller(s) of system control logic 508. For one embodiment, at least one of the processor(s) 504 may be integrated on the same die with logic for one or more controller(s) of system control logic 508 to form a System on Chip (SoC).

In various embodiments, the I/O devices 532 may include user interfaces designed to enable user interaction with the system 500, peripheral component interfaces designed to enable peripheral component interaction with the system 500, and/or sensors designed to determine environmental conditions and/or location information related to the system 500.

In various embodiments, the user interfaces could include, but are not limited to, a display (e.g., a liquid crystal display, a touch screen display, etc.), a speaker, a microphone, one or more cameras (e.g., a still camera and/or a video camera), a flashlight (e.g., a light emitting diode flash), and a keyboard.

In various embodiments, the peripheral component interfaces may include, but are not limited to, a non-volatile memory port, a universal serial bus (USB) port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 520 to communicate with components of a positioning network, e.g., a global positioning system (GPS) satellite.

In various embodiments, the system 500 may be a mobile computing device such as, but not limited to, a laptop computing device, a tablet computing device, a netbook, a smartphone, etc. In various embodiments, system 500 may have more or less components, and/or different architectures.

In some embodiments, an apparatus, e.g., a UE, is described that includes a communications module configured to receive CRS parameters associated with individual base stations of a CoMP measurement set including a plurality of base stations, and to receive a transmission point index corresponding to a first base station of the CoMP measurement set. The UE may further include a mapping module coupled with the communications module and configured to produce a PDSCH mapping pattern based on the CRS parameters associated with the first base station.

In some embodiments, the communications module may be further configured to use the CRS parameters associated with the first base station for subsequent communications with the first base station.

In some embodiments, the CRS parameters and transmission point index may be received from a second base station of the CoMP measurement set. In other embodiments, the CRS parameters may be received from the second base station, and the transmission point index may be received from the first base station.

In some embodiments, the CRS parameters may be received via radio resource control (RRC) signaling. The transmission point index may be received via physical layer signaling (e.g., the transmission point index may be included in downlink control information). The CRS parameters may include a number of CRS antenna ports and/or a CRS frequency shift of the individual base stations. In some embodiments, the CRS parameters may further include information related to OFDM resource elements dedicated to control information for the individual base stations. In further embodiments, the CRS parameters may further include MBSFN information for the individual base stations. In some embodiments, the CRS parameters may be received as part of a configuration protocol for the CoMP measurement set. The configuration protocol may further include configuring CSI-RS parameters and uplink control channel parameters for communications between the user equipment and one or more base stations of the CoMP measurement set.

In some embodiments, the communications module may be further configured to receive a transmission from the first base station, the transmission including an OFDM frame having a plurality of CRSs. The CRSs may be arranged within the frame according to the PDSCH mapping pattern.

In some embodiments, the apparatus may further include memory configured to store the received CRS parameters.

In some embodiments, an apparatus, e.g., a base station (such as an eNB), is described to include a communications module, and a CoMP management module coupled to the communications module and configured to transmit, to a UE via the communications module, CRS parameters associated with individual base stations of a CoMP measurement set including a plurality of base stations.

In some embodiments, the CoMP management module may be further configured to transmit a transmission point index to the UE. The transmission point index may correspond to a first base station of the CoMP measurement set scheduled to communicate with the UE. In some embodiments, the scheduled base station may transmit the transmission point index. In other embodiments, a base station that is not the scheduled base station may transmit the transmission point index.

In some embodiments, the base station may be a serving node of the CoMP measurement set configured to manage communications between the UE and the plurality of base stations of the CoMP measurement set.

In some embodiments, the CRS parameters may include a number of CRS antenna ports and/or a CRS frequency shift of the individual base stations. The CRS parameters may be transmitted by radio resource control signaling. The transmission point index may be transmitted to the UE in a downlink control information transmission. In some embodiments, the CRS parameters may be transmitted as part of a configuration protocol for the CoMP measurement set. The configuration protocol may further include configuring channel state information reference signal (CSI-RS) parameters and uplink control channel parameters for communications between the UE and one or more base stations of the CoMP measurement set.

In various embodiments, a method is disclosed that includes receiving, by a UE via radio resource signaling, CRS parameters associated with individual base stations of a CoMP measurement set including a plurality of base stations; receiving, by the UE via a downlink control information transmission, a transmission point index corresponding to a first base station of the coordinated multipoint measurement set; and producing a PDSCH mapping pattern based on the CRS parameters associated with the first base station.

In various embodiments, one or more computer-readable media are disclosed that have instructions, stored thereon, that, when executed cause a user equipment to receive CRS parameters associated with individual base stations of a CoMP measurement set including a plurality of base stations, the CRS parameters including a number of CRS antenna ports of the individual base stations; receive a transmission point index corresponding to a first base station of the coordinated multipoint measurement set; and produce a PDSCH mapping pattern based on the CRS parameters associated with the first base station.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. A user equipment (UE) comprising:
communications circuitry to:
receive, via radio resource control (RRC) signaling from a first transmission point, a plurality of individual common reference signal (CRS) parameter sets;
receive a physical downlink control channel (PDCCH) that includes a 2-bit value to indicate one of the individual CRS parameter sets that is to be used by the UE to decode a physical downlink shared channel (PDSCH), wherein the PDCCH is received from a second transmission point that is different from the first transmission point, and wherein the PDSCH is to be transmitted by the second transmission point; and
mapping circuitry coupled to the communications circuitry, the mapping circuitry to:
identify the indicated individual CRS parameter set, from the plurality of individual CRS parameter sets, based on the 2-bit value; and
decode the PDSCH transmitted by the second transmission point based on the identified individual CRS parameter set.

2. The UE of claim 1, wherein the mapping circuitry is further to determine a PDSCH resource element (RE) mapping pattern based on the identified individual parameter set, and wherein the PDSCH is decoded based on the PDSCH RE mapping pattern.

3. The UE of claim 1, wherein the individual CRS parameter sets of the plurality of CRS parameter sets include a number of CRS antenna ports and a CRS frequency shift.

4. The UE of claim 3, wherein the individual CRS parameter sets further include information related to a quantity or location of REs that are dedicated to multicast/broadcast single frequency network (MBSFN) information.

5. The UE of claim 4, wherein the individual CRS parameter sets further include one or more channel state information reference signal (CSI-RS) parameters.

6. The UE of claim 3, wherein the individual CRS parameter sets further include a transmission point index, and wherein the 2-bit value corresponds to the transmission point index of the indicated individual parameter set.

7. The UE of claim 1, wherein the individual CRS parameter sets are associated with different transmission points of a Long Term Evolution (LTE) network that are included in a coordinated multipoint (CoMP) measurement set.

8. The UE of claim 1, wherein the 2-bit value is included in downlink control information (DCI) of the PDCCH, and wherein the PDCCH is detected after the receipt of the plurality of parameter sets via the RRC signaling.

9. One or more non-transitory computer-readable media having instructions, stored thereon, that when executed cause an evolved Node B (eNB) to:

transmit, to a user equipment (UE), a physical downlink control channel (PDCCH) that includes a 2-bit value to indicate an individual common resource signal (CRS) parameter set from among a plurality of parameter sets that were transmitted to the UE by another eNB, wherein the indicated individual CRS parameter set is to be used by the UE to decode a physical downlink shared channel (PDSCH); and
transmit, to the UE, the PDSCH based on the indicated individual parameter set.

10. The one or more computer-readable media of claim 9, wherein, to transmit the PDSCH based on the indicated individual parameter set, the eNB is to provide the PDSCH with a PDSCH resource element (RE) mapping pattern according to the indicated individual parameter set.

11. The one or more computer-readable media of claim 9, wherein the individual parameter sets include a number of CRS antenna ports and a CRS frequency shift.

12. The one or more computer-readable media of claim 11, wherein the individual parameter sets further include information related to a quantity or location of REs that are dedicated to multicast/broadcast single frequency network (MBSFN) information.

13. The one or more computer-readable media of claim 11, wherein the individual parameter sets further include one or more channel state information reference signal (CSI-RS) parameters.

14. The one or more computer-readable media of claim 11, wherein the individual CRS parameter sets further include a transmission point index, and wherein the 2-bit value corresponds to the transmission point index of the indicated individual parameter set.

15. The one or more computer-readable media of claim 9, wherein the CRS parameter sets are associated with different transmission points of a Long Term Evolution (LTE) network.

16. The one or more computer-readable media of claim 9, wherein the 2-bit value is transmitted after the transmission of the plurality of CRS parameter sets.

17. An apparatus to be employed by a user equipment (UE), the apparatus comprising:
means for receiving, via radio resource control (RRC) signaling, a plurality of parameter sets, wherein individual parameter sets of the plurality of parameter sets include a number of common reference signal (CRS) antenna ports and a CRS frequency shift;
means for receiving, after the plurality of parameter sets are received, downlink control information (DCI) that includes a 2-bit value to indicate one of the individual parameter sets that is to be used by the UE to decode a physical downlink shared channel (PDSCH);
means for identifying the individual parameter set indicated by the 2-bit value; and
means for decoding the PDSCH based on the identified individual parameter set.

18. The apparatus of claim 17, further comprising means for determining a PDSCH resource element (RE) mapping pattern based on the identified individual parameter set, and wherein the means for decoding the PDSCH is to decode the PDSCH based further on the PDSCH RE mapping pattern.

19. The apparatus of claim 17, wherein the individual parameter sets further include:
information related to a quantity or location of REs that are dedicated to multicast/broadcast single frequency network (MBSFN) information; and
one or more channel state information reference signal (CSI-RS) parameters.

20. The apparatus of claim 17, wherein the individual parameter sets further include a transmission point index, and wherein the 2-bit value corresponds to the transmission point index of the indicated individual parameter set.

21. The apparatus of claim 17, wherein the means for receiving the plurality of parameter sets is to receive the plurality of parameter sets from a first transmission point and wherein the means for receiving the DCI is to receive the DCI from a second transmission point that is different from the first transmission point.

22. An apparatus to be employed by an evolved Node B (eNB), the apparatus comprising:
   means for transmitting, to a user equipment (UE) via radio resource control (RRC) signaling, a plurality of parameter sets, wherein individual parameter sets of the plurality of parameter sets include a number of common reference signal (CRS) antenna ports, a CRS frequency shift, and a transmission point index;
   means for transmitting, after the plurality of parameter sets are transmitted, downlink control information (DCI) that includes a 2-bit value that corresponds to the transmission point index of one of the individual parameter sets to indicate that the individual parameter set is to be used by the UE to decode a physical downlink shared channel (PDSCH); and
   means for modulating the PDSCH based on the indicated individual parameter set.

23. The apparatus of claim 22, further comprising means for determining a PDSCH resource element (RE) mapping pattern based on the indicated individual parameter set, and wherein the means for modulating the PDSCH is to modulate the PDSCH based further on the PDSCH RE mapping pattern.

24. The apparatus of claim 22, wherein the individual parameter sets further include:
   information related to a quantity or location of REs that are dedicated to multicast/broadcast single frequency network (MBSFN) information; and
   one or more channel state information reference signal (CSI-RS) parameters.

25. The apparatus of claim 22, wherein the parameter sets are associated with different transmission points of a Long Term Evolution (LTE) network.

* * * * *